United States Patent
Leal et al.

(10) Patent No.: US 9,785,968 B1
(45) Date of Patent: Oct. 10, 2017

(54) SELECTING CONTENT BASED ON USER ACTIONS AND PREFERENCES ASSOCIATES WITH A SAME TIME PERIOD IN A PREVIOUS YEAR

(75) Inventors: Marcus A. Leal, Rio de Janeiro (BR); Emily K. Moxley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/175,702

(22) Filed: Jul. 1, 2011

(51) Int. Cl.
*G06Q 30/00* (2012.01)
*G06Q 30/02* (2012.01)

(52) U.S. Cl.
CPC ............................... *G06Q 30/0251* (2013.01)

(58) Field of Classification Search
CPC ...... G06Q 30/0251–30/0256; G06F 17/30864; G06F 17/30867; H04L 67/30; H04L 67/306; H04L 67/22
USPC ................................. 705/14.49–14.67, 14.53
See application file for complete search history.

(56) References Cited

U.S. PATENT DOCUMENTS

| | | | | |
|---|---|---|---|---|
| 5,835,087 A * | 11/1998 | Herz | .................... | G06Q 20/383 348/E7.056 |
| 6,460,036 B1 * | 10/2002 | Herz | ................. | G06F 17/30867 348/E7.056 |
| 6,622,179 B2 * | 9/2003 | Welder | .................. | G06F 9/4401 710/15 |
| 7,050,989 B1 * | 5/2006 | Hurt | ....................... | G06Q 30/02 705/14.51 |
| 7,756,744 B2 * | 7/2010 | Schiff | .................... | G06Q 20/10 705/14.49 |
| 7,895,078 B2 * | 2/2011 | Schiff | .................... | G06Q 20/10 705/14.49 |
| 8,180,769 B2 | 5/2012 | Liu et al. | | |
| 2001/0011226 A1 * | 8/2001 | Greer | ..................... | G06Q 30/02 705/14.53 |
| 2003/0052165 A1 * | 3/2003 | Dodson | ................... | H04L 29/06 235/381 |
| 2005/0131866 A1 * | 6/2005 | Badros | .............. | G06F 17/30867 |
| 2005/0216581 A1 * | 9/2005 | Blumenau | ......... | G06F 17/30867 709/223 |
| 2005/0240580 A1 | 10/2005 | Zamir et al. | | |
| 2006/0161665 A1 | 7/2006 | Tsai | | |
| 2006/0212353 A1 * | 9/2006 | Roslov | ................... | G06Q 30/02 705/14.54 |
| 2007/0220010 A1 | 9/2007 | Ertugrul | | |

(Continued)

*Primary Examiner* — Lance L Barry
(74) *Attorney, Agent, or Firm* — Fish & Richardson P.C.

(57) ABSTRACT

Methods, systems, and apparatus, including computer programs encoded on a computer storage medium, for long-term targeting. In one aspect, a method includes: assigning a user a unique identifier and recognizing the user when the user interacts with a content system; logging user actions and preferences as the user interacts with one or more web based resources over a long time period where the long time period exceeds a life of one session and an expiration of one or more cookies residing on a user device; identifying logged user actions and preferences that are associated with a same time period in a previous year, including identifying immutable and mutable aspects of the logged user actions and preferences that are time-related; adjusting the mutable aspects based on the current date; and providing, to the user, content based on the immutable aspect, the adjusted mutable aspects, and information included in a content request.

20 Claims, 6 Drawing Sheets

(56) References Cited

U.S. PATENT DOCUMENTS

| | | | |
|---|---|---|---|
| 2008/0015878 A1 | 1/2008 | Feng et al. | |
| 2008/0140524 A1 | 6/2008 | Anand et al. | |
| 2008/0199042 A1* | 8/2008 | Smith | G06Q 30/02 382/100 |
| 2008/0222283 A1* | 9/2008 | Ertugrul | G06Q 30/02 709/224 |
| 2008/0235351 A1 | 9/2008 | Banga et al. | |
| 2009/0125510 A1 | 5/2009 | Graham et al. | |
| 2009/0171760 A1 | 7/2009 | Aarnio et al. | |
| 2009/0265236 A1* | 10/2009 | Schultz | G06Q 30/0255 705/14.53 |
| 2010/0106562 A1* | 4/2010 | Taylor | G06Q 30/02 705/14.54 |
| 2010/0250558 A1 | 9/2010 | Wang | |
| 2010/0280903 A1* | 11/2010 | Barlin | G06F 17/30867 705/14.58 |
| 2010/0281364 A1 | 11/2010 | Sidman | |
| 2011/0010243 A1* | 1/2011 | Wilburn | G06Q 30/02 705/14.53 |
| 2011/0078333 A1 | 3/2011 | Jakubowski | |
| 2011/0126220 A1 | 5/2011 | Lerner | |
| 2011/0154264 A1 | 6/2011 | Aravamudan et al. | |
| 2011/0208850 A1 | 8/2011 | Sheleheda et al. | |
| 2011/0246568 A1 | 10/2011 | Morimoto | |
| 2012/0066071 A1* | 3/2012 | Thomas | G06Q 30/0269 705/14.66 |
| 2012/0078725 A1 | 3/2012 | Maitra et al. | |
| 2012/0130813 A1 | 5/2012 | Hicken et al. | |
| 2012/0245989 A1 | 9/2012 | Kakarla et al. | |

* cited by examiner

FIG. 4A http://news.search.com

460  September 10, 2014    452   John Biggs

454 → Gifts    [Search]

456 {
Gifts for Girls
www.gifts-4-girls.com -- Cached - Similar

Tween Presents
www.tweengifts.com -- Cached - Similar

Birthday Present Ideas
www.b-day-presents.com -- Cached - Similar
}

458 {
Tween Presents
Clothes, books, and other ideas!
www.tweengifts.com mp3 Gift Cards
For the tween in your life
www.gifthermusic.com

Girls Rule!
Stickers, t-shirts, apparel all about positive messages for pre-teen girls
www.allgirlsrule.com
}

SELECTING CONTENT BASED ON USER ACTIONS AND PREFERENCES ASSOCIATES WITH A SAME TIME PERIOD IN A PREVIOUS YEAR

BACKGROUND

This specification relates to information presentation.

Most individuals using a browser to connect to the Internet have experienced a request to enable cookies for a particular web site or for the browser itself. Without cookies, each retrieval of a web page or component of a web page is an isolated event, mostly unrelated to all other views of the pages of the same site. However, many users do not understand what a "cookie" is.

A cookie, also known as a web cookie, browser cookie, or HTTP cookie, can be of the form of text stored on a user's computer by the web browser used to retrieve the web page. Cookies can be arbitrary pieces of data chosen by the web server and sent to the browser. In most cases, the browser returns the cookies unchanged to the server. A cookie can be used for authentication, storing site preferences, shopping cart contents, the identifier for a server-based session, or anything else that can be accomplished through storing, for example, text data. One example cookie is a double-click cookie that can include, for example, one or more name-value pairs containing bits of information, which can be encrypted for information privacy and data security purposes. The cookie can be sent as a field in the header of the HTTP response by a web server to a web browser and then sent back unchanged by the browser each time it accesses that server. In most cases, each instance of switching from a browser or a device, or reinstalling/cleaning/or upgrading the device will clear all cookies.

Cookies may be set by the server with or without an expiration date. Cookies without an expiration date exist until the browser terminates, while cookies with an expiration date may be stored by the browser until the expiration date passes. Users may also manually delete cookies in order to save space or to avoid privacy issues.

SUMMARY

This specification describes technologies relating to long term targeting of content to users.

In general, one innovative aspect of the subject matter described in this specification can be embodied in methods, systems, computer program products and the like where the method includes the steps of identifying a user including assigning the user a unique identifier and recognizing the user each time the user interacts with a content management system; logging user actions and preferences as a user interacts with one or more web based resources over time, over different devices and with different browsers including storing preferences of the user; receiving from the user a request for content, the request received at the content management system; and targeting content to the user based on the stored preferences.

Other embodiments of this aspect include corresponding systems, apparatus, and computer programs, configured to perform the actions of the methods, encoded on computer storage devices.

The unique identifier can be associated with a user profile. The user profile can be a universal user profile, in as much as it can be accessed and used across plural different devices, operating systems, browsers, etc. The logging of the user actions and preferences over time can be over a predetermined time period that is greater than, for example, 30 days. The logging of the user actions and preferences can include placing a universal cookie in each different browser cache on each different device. The logging the user actions and preferences can be disabled when the user selects a browser that does not save cookies. The stored preferences of the user, e.g., received from an IP address of a device currently being used by the user, can have a stronger weight in targeting content to the user for the device than stored preferences received from another IP address. The stored preferences of the user received during or associated with a particular time of day on a previous day from a device being used by the user during the particular time of day can have a stronger weight than stored preferences received previously at a different time of day. The unique identifier can be linked to a browser on a device for logging the user actions automatically.

In general, another aspect of the subject matter described in this specification can be embodied in methods that include the actions of identifying a user including assigning the user a unique identifier and recognizing the user each time the user interacts with a content management system; logging user actions and preferences as a user interacts with one or more web based resources over a long time period where the long term time period exceeds a life of one session and an expiration of one or more cookies residing on a device used by the user to access web based resources, logging including storing the preferences; receiving from the user a request for content, the request received at the content management system; and targeting content to the user based on the stored preferences.

The stored preferences of the user received on a first day can have a stronger weight than stored preferences received on a prior second day. Identifying the user using the unique identifier can include generating one or more new cookies on the device. Information can be stored on the device based on browser use. Information stored on the device and the stored preferences can both be used to target content to the user. A content provider can disable storing the tracked user actions and preferences for logging that exceeds the long time period. The unique identifier can be a user profile. Content can be targeted to the user based on information explicitly associated with the user profile. The explicit targeting can be disabled based on user preferences associated with the user profile.

Other embodiments of this aspect include corresponding systems, apparatus, and computer programs, configured to perform the actions of the methods, encoded on computer storage devices.

Particular embodiments of the subject matter described in this specification can be implemented so as to realize none, one or more of the following advantages. Broader and longer term web browsing behavior can be correlated to enable new targeting strategies and improve the effectiveness of current methods. For example, the data can allow advertisers to target sequential content items to users over time.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Methods, systems and computer program products are provided for long term targeting. A user can be assigned a unique identifier. The user can log in from a computing device such as a desktop computer, a laptop computer, a smart mobile device, etc., to a server to store information and associate it with the unique identifier. For example, information regarding the user's interactions on the Internet can be stored to a centralized server each time the user logs in. The user device can automatically generate a cookie using data from the server to the browser that the user is currently using upon logging into the centralized server. The downloaded cookie allows the current browser to receive data that can allow a content serving system to provide information that is relevant to a particular user at a particular time during the year.

Figure 1:
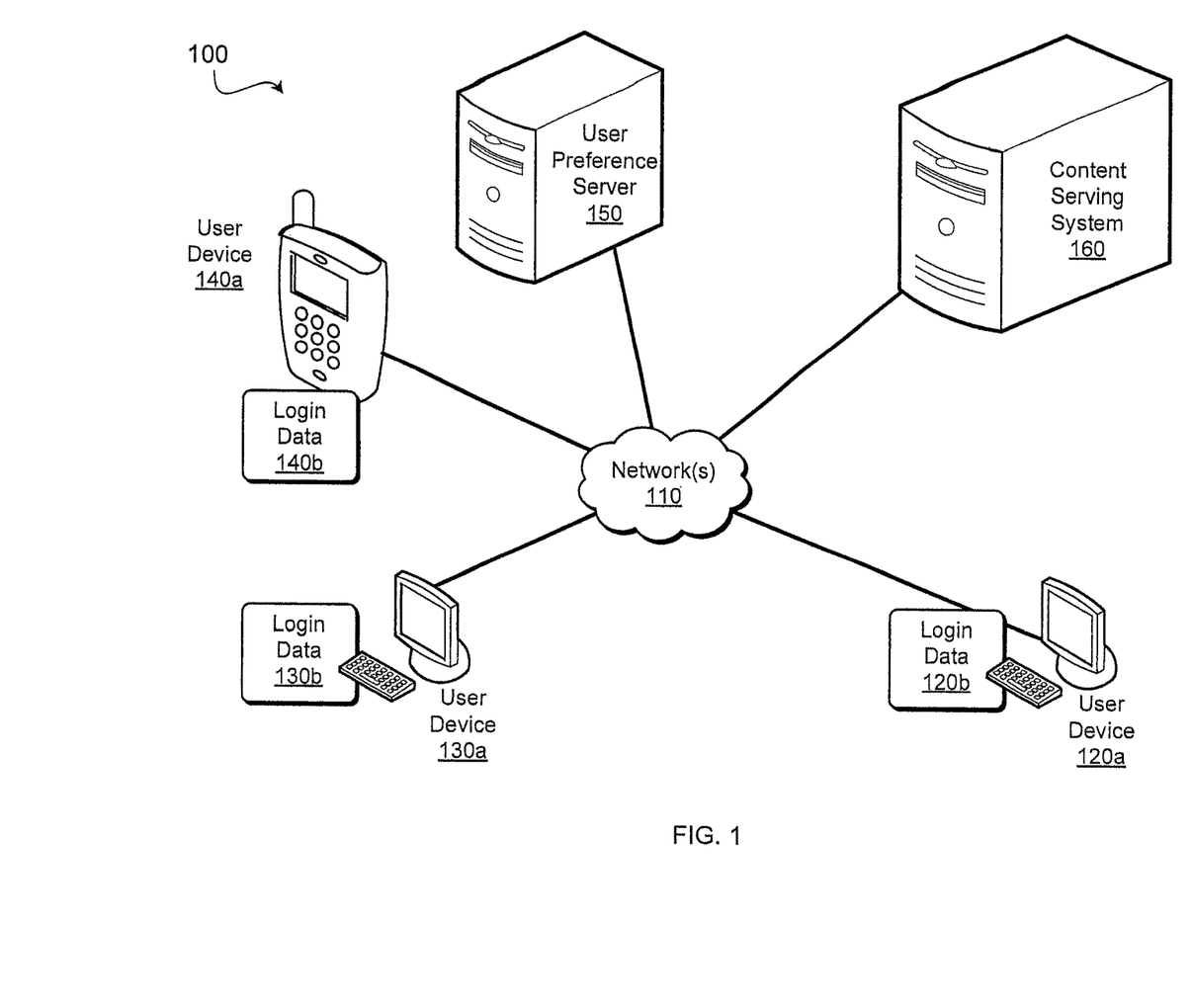
FIG. 1 is a block diagram of an example environment in which content items are provided to user devices.

FIG. 1 is a block diagram of an example content management system 100 for long term targeting based on user-specific information. A unique identifier associated with a user can be created. The user can be associated with the unique identifier to allow for storage of information regarding user selections and preferences. The unique identifier can be associated with an account for storing user actions and preferences in a central location. Information regarding user selections and preferences can be uploaded to a website and associated with the unique identifier. Each subsequent time the user interacts with a resource that is associated with the website stored information can be provided to the website. Content targeted to the user can be provided based on the centrally stored information. Likewise, any information the current web browser collects can be uploaded.

In some implementations, a network 110 such as the Internet can, for example, can connect various devices to allow transmission of data between the devices. In this example, various user devices 120a, 130a, and 140a can upload login data 120b, 130b, and 140b through the network to a user preference server 140. While reference is made to logging in users, no specific log in is required. For example, a single user may be associated with a device and no login information may be required. The various user devices 120, 130a, and 140a can receive authentication data to identify the user. For example, a universal cookie can be generated in each different browser cache on each different device. The user preference server 150 can receive user actions and preferences from the user devices 120a, 130a, and 140a. The user actions and preferences can be stored with previously stored information including prior user preferences and selections. The data from the user preference server 150 and the user devices 120a, 130a, and 140a can be provided to a content serving system 160. This data can be used to determine content data specific to the user of the user devices 120a, 130a, and 140.

The user devices 120a, 130a, and 140a can be any device, such as personal computers, mobile devices, cell phones, personal digital assistants (PDAs), television systems, etc. The users of user devices 120a, 130a, and 140a can be members having corresponding unique identifiers who have logged into to the user preference server 150. In some implementations, the login data 120b, 130b, and 140b can be matching data if the user of the user devices 120a, 130a, and 140a is logging into the same account. For example, a user could have three separate devices: one computer for work, one computer for home, and a mobile device. In some implementations, multiple users can log into the user devices 120a, 130a, and 140a. For example, a home computer may have multiple users providing login data, each user having a separate unique identifier.

In some implementations, the user actions and preferences can be stored for a period of time longer than a predetermined period of time. The length of time user actions and preferences associated with a unique identifier can exceed, for example, a predetermined number of days (e.g., 30) or the lifetime of a conventional cookie and can be stored centrally in the user preference server 150. For example, the user actions and preferences logged over time can represent actions over a predetermined time period that is greater than 30 days, greater than a year, or the user actions and preferences can be stored indefinitely.

In some implementations, the user can disable logging. For example, the user can disable logging by logging out of an account associated with the unique identifier. A new cookie can be generated in order to ensure that logging is disabled. If the browser has cookies disabled, disabling logging the user actions and preferences when the user selects a browser does not save cookies. In some implementations, the information associated with the unique identifier can be enabled, for example, if the user selects to "opt in." Alternatively, the system can provide an "opt out" option. In some implementations, the unique identifier can be linked to a browser on a device for logging the user actions automatically. For example, the user device 140a can be a mobile device with a browser that automatically provides login data to the user preference server 150.

In some implementations, the user device can authenticate the user by requesting login information. For example, the user can visit a site on a browser where the cookies associated with the browser have expired, or the user can visit a site on a different browser than the browser the user used to visit the site previously.

In some implementations, the user preference server 150 can provide weights to the user actions and preferences in targeting content to the user. For example, the stored preferences and actions of the user received from a device currently being used by the user can have a stronger weight in targeting content to the user than stored actions and preferences received from another device (e.g., at a different IP address). The stored preferences and actions of the user received from a current location of the user can have a stronger weight in targeting content to the user than stored actions and preferences from another location. The same weight determination can be made for the stored preferences and actions of the user received during a particular time of day on a previous day from a device being used by the user during the particular time of day than stored preferences and actions received previously at a different time of day. The same weight determination can be made for the stored preferences and actions from one browser or device being used by the user than a different browser or device.

The user preference server 150 can provide the stored information to the content serving system 160. The stored user actions and preferences can, for example, include data that can be utilized by the content serving system 160 to identify one or more content items that are determined to be relevant to a unique identifier, e.g., advertisements for products and/or services that may be of interest to a user associated with a unique identifier.

One of the user devices 140a can render the requested data in a presentation environment, e.g., in a web browser application. Upon rendering the requested data, the user device 140 executes the request code, which causes the user device 140a to issue a content request, e.g., an advertisement request, to the content serving system 160. In response, the content serving system 160 can provide one or more content items to the user device 140a. In some implementations, the one or more content items can be provided by a content provider of a web page, for example, a publisher. The publisher can, for example, be included in the content serving system 160 or can be a part of the system 100 separate from the content serving system 160.

In some implementations, a content serving system 160 can directly, or indirectly, enter, maintain, and log content items. The content items can, for example, include a web page or other content document, or text, graphics, video, audio, mixed media, etc. In some implementations, the content items are advertisements. The advertisements can, for example, be in the form of graphical ads, such as banner ads, text only ads, image ads, audio ads, video ads, ads combining one of more of any of such components, etc. The advertisements can also include embedded information, such as links, meta-information, and/or machine executable instructions.

In some implementations, the content items can be provided to the content serving system 160 by content item sponsors, e.g., advertisers. The advertisers can, for example, include web sites having "landing pages" that a user is directed to when the user clicks an advertisement presented on page provided by the content serving system 160. For example, the content item sponsors can provide content items in the form of "creatives," which are advertisements that may include text, graphics and/or audio associated with the advertised service or product, and a link to a web site.

In some implementations, the content serving system 160 can monitor and/or evaluate performance data related to the content items. For example, the performance of each advertisement can be evaluated based on a performance metric, such as a click-through rate, a conversion rate, or some other performance metric. A click-through can occur, for example, when a user of one of the user devices, e.g., user device 140a, selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user of the user device 140a clicks on an advertisement, is referred to the advertiser's Web page, such as one of the landing pages, and consummates a purchase before leaving that Web page. Other conversion types can also be used. A conversion rate can, for example, be defined as the ratio of the number of conversions to the number of impressions of the advertisement (i.e., the number of times an advertisement is rendered) or the ratio of the number of conversions to the number of selections. Other types of conversion rates can also be used.

Other performance metrics can also be used. The performance metrics can, for example, be revenue related or non-revenue related. In some implementations, the performance metrics can be parsed according to time, e.g., the performance of a particular content item may be determined to be very high on weekends, moderate on weekday evenings, but very low on weekday mornings and afternoons, for example.

It is desirable that each of the content items be related to the interests of the users utilizing the user devices 120a, 130a, and 140a, as users are generally more likely to select, e.g., click through, content items that are of particular interest to the users. In some implementations, relevant content items are identified by identifying the user actions and preferences for each unique identifier, and providing the user actions and preferences to the content serving system 160. The user actions and preferences of a particular unique identifier can, for example, be provide to the content serving system 160 by a user device 120a, 130a, and 140a associated with the particular unique identifier.

In some implementations, the content serving system 160 can use information from the user preference server 150 to provide better performance metrics for a creative. For example, if a ski seller is located in Northern California, he can select to show his creative to people in Northern California who shopped for skis or visited ski-related sites in the past two years. The audience base in this example can be too broad. In some implementations, the advertiser can chose to exclude users that would be unlikely to purchase products from the advertiser. For example, the advertiser can exclude users who have visited high-end ski sites for more than one season. In some implementations, the content serving system 160 can charge a premium to use information from the user preference server 150. For example, the premium can be a flat fee or a multiplier of the cost without access to the information. In some implementations, the publisher of a website can opt out of allowing the user preferences and actions collected in conjunction with the publisher-provided content to be stored by the user preference server 150.

In some implementations, the user preference server 150 can be integrated into the long term targeting based system 100. In some implementations, the user preference server 150 can be integrated into the content serving system 160. The user preference server 150 can be implemented in software and executed on a processing device, such as the computer system 500 of FIG. 5. Example software implementations include C, C++, Java, or any other high-level programming language that may be utilized to produce source code that can be compiled into executable instructions. Other software implementations can also be used, such as applets, or interpreted implementations, such as scripts, etc.

Figure 2:
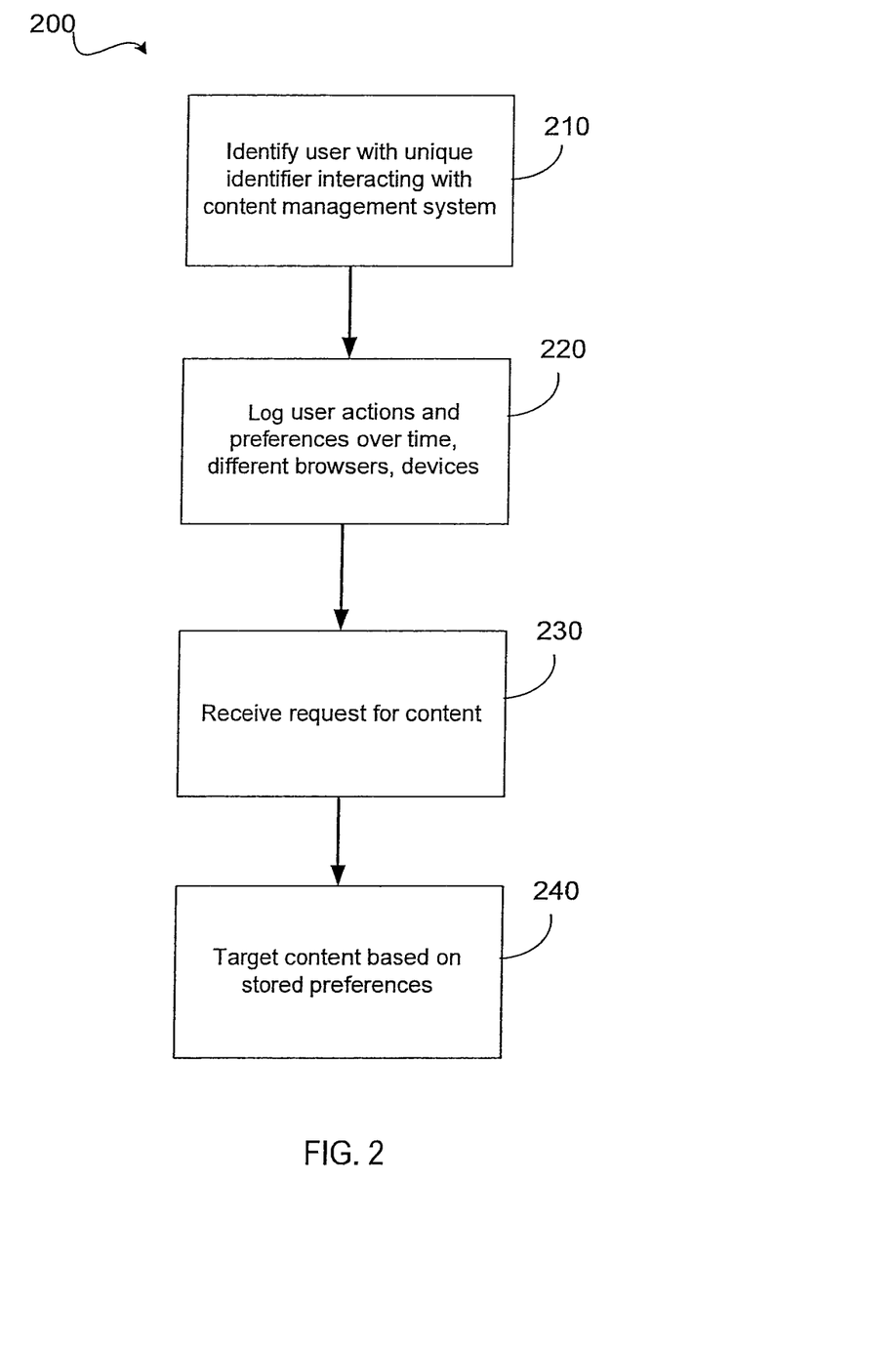
FIG. 2 is a flow chart of an example process for long term targeting.

FIG. 2 is a flow chart of an example process 200 for long term targeting. The process 200 can be performed by, for example, the system 100 of FIG. 1.

A user is identified including assigning the user a unique identifier and recognizing the user each time the user interacts with a content management system (210). As described above, a user device 120a can provide login data 120b to a user preference server 150 in order to associate the user of the user device 120a with a unique identifier. For example, the login data can be sent automatically through the user logging into the user device locally.

As a user interacts with one or more web based resources over time, over different devices and with different browsers preferences of the user are stored including storing preferences of the user, user actions and preferences are logged (220). As described above, the user preference server 150 can receive information regarding user actions and preferences from user devices 120a, 130a, and 140a. The information can be associated with the user's unique identifier. In some implementations, individual browsers on a user device 120a can provide information to the user preference server 150. For example, a user may use Internet Explorer and Firefox on the same user device 120a. Information from the user's actions on both browsers can be provided to the user preference server 140 even though neither browser accesses the other's locally stored cookies.

A request for content is received from the user, the request being received at the content management system (230). For example, the content serving system 160 can receive a request from the user device 120a, such as a request for a website.

Content is targeted to the user based on the stored preferences (240). As described above, the content serving system 160 can determine relevant content items based on information stored on the user preference server 150. For example, the content serving system 160 can provide creatives along with the requested website where the creatives are targeted based on the information associated with the unique identifier from the user preference server 150.

Figure 3:
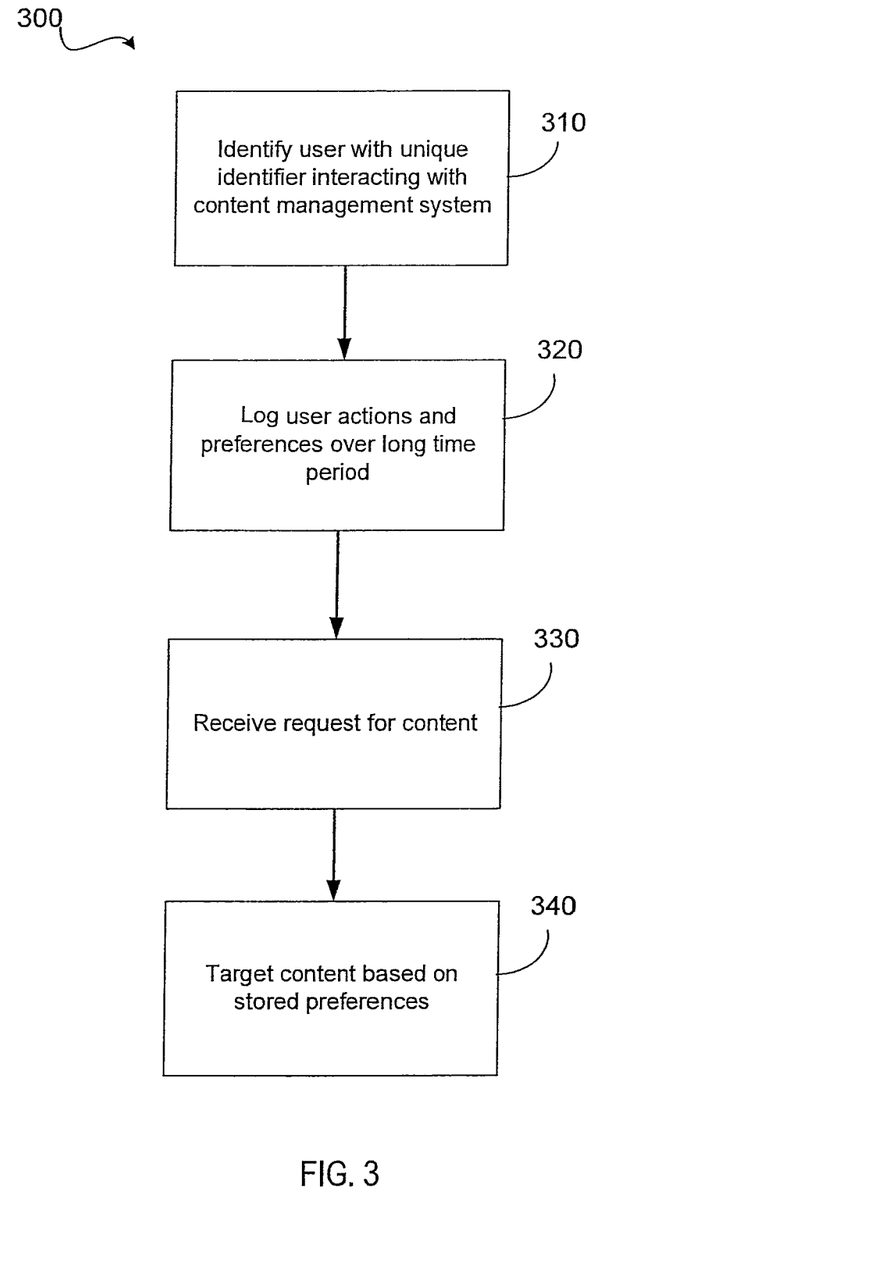
FIG. 3 is a flow chart of another example process for long term targeting.

FIG. 3 is a flow chart of an example process 300 for long term targeting. The process 300 can be performed, for example, by the system 100 of FIG. 1.

A user is identified including assigning the user a unique identifier and recognizing the user each time the user interacts with a content management system (310). As described above, a user device 120a can provide login data 120b to a user preference server 150 in order to associate the user of a user device 120a with a unique identifier. For example, the user can log into the user preference server through the browser by providing the login data 120b.

As a user interacts with one or more web based resources over a long time period, where the long term time period exceeds a life of one session and an expiration of one or more cookies residing on a device used by the user to access web based resources, user actions and preferences are logged, the logging including storing the preferences and actions (320). For example, the user preference server 150 can log and store user actions and preferences to associate the actions and preferences with the unique identifier. Long term central storage allows the content management system to follow a user irrespective of whether a cache may have been cleared or whether cookies have expired.

A request for content is received from the user, the request being received at the content management system (330). For example, the content serving system 160 can receive a request from the user device 120a, such as a website.

Content is targeted to the user based on stored preferences and actions (340). As described above, the content serving system 160 can determine relevant content items based on information stored on the user preference server 150. For example, a particular content item (e.g., referencing a particular website) can be presented. The stored preferences can be provided by the user preference server 150.

Implicit Assumptions Associated with User Actions and Preferences

Figure 4A:
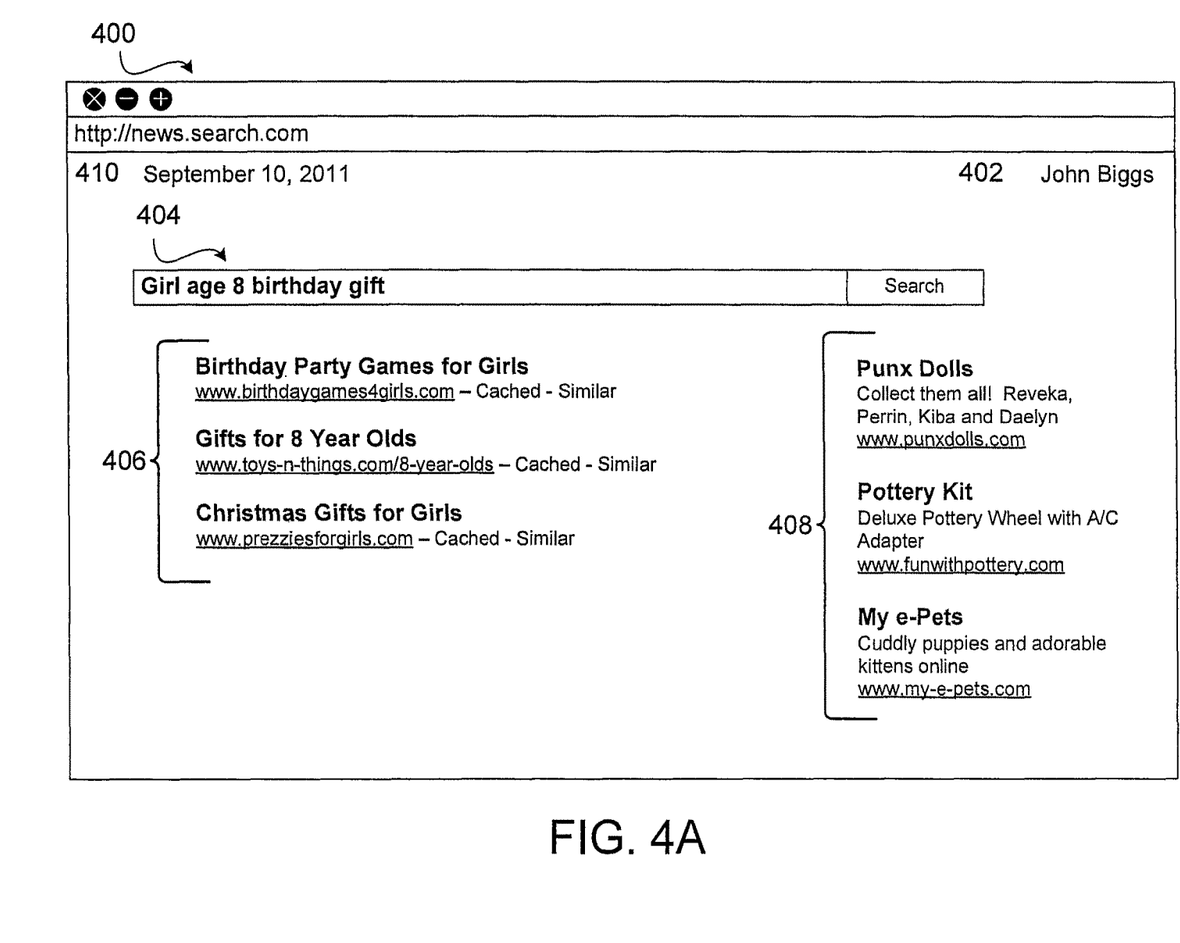
FIG. 4A is an example of a browser for displaying content items for delivery to users.

FIG. 4A is an example of a web page in a browser 400 for displaying content items for delivery to users in response to a search query. The browser 400 can display a unique identifier 402 for a user to notify the user that his actions and preferences are being logged and stored remotely. The user can input a search query 404 to receive query-based content items 406 for display in the browser 400. The browser 400 can also display targeted content items 408, shown in FIG. 4A as advertisements. A search date 410 is provided in FIG. 4A for explanatory purposes, as will be further explained in FIG. 4B.

As shown in this example, the user action, e.g., the search query 404 "girl age 8 birthday gift," can be received by a content serving system 160 as described in FIG. 1. The user is searching for gift ideas for a young girl. The date 410 shown in FIG. 4A is Sep. 10, 2011. Presumably, the gift recipient's birthday is in the near future. This user action can be stored remotely in association with the unique identifier 402. The user can select a content item of either one of the query-based content items 406 or one of the targeted content items 408. This selection and redirection to a landing page can also be stored remotely. Finally, if the user finds a gift to purchase for the recipient, a conversion can be stored.

The user actions and preferences can provide more information. For example, if the time from the initial search query to the purchase of a gift is under three minutes, an implicit assumption can be made that the user is an "impulse buyer," e.g., someone who makes purchase decisions quickly rather than researching multiple products and comparing prices, options, and brands of different products. Conversely, if the user spends several days and performs the same or similar searches while visiting multiple landing pages related to those results before purchasing a product, an implicit assumption can be made that the user is a "comparison shopper." These implicit assumptions can be stored remotely as user actions and preferences. The implicit assumptions can be used, for example, by advertisers. Advertisers can use the implicit assumptions to more narrowly design/create campaigns that have a higher ROI. Further examples of implicit assumptions are provided below.

Figure 4B:
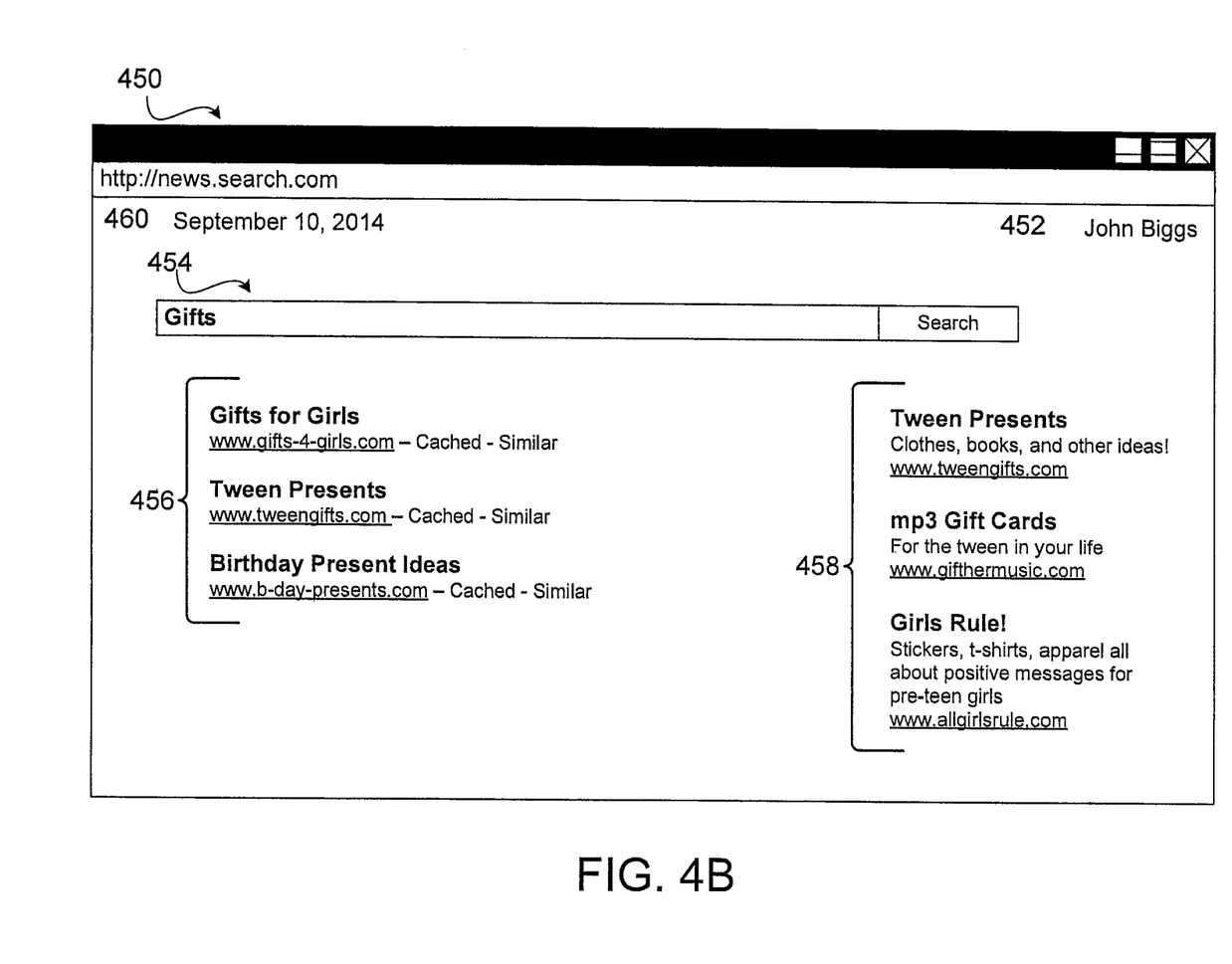
FIG. 4B is an example of a browser for displaying content items for delivery to users.

FIG. 4B is an example of a web page in another browser 450 for displaying content items for delivery to users. The browser 450 can display a unique identifier 452 for a user to notify the user that his actions and preferences are being logged and stored remotely. The user can input a search query 454 to receive query-based content items 456 for display in the browser 450. The browser 450 can also display targeted content items 458. A search date 460 is provided in FIG. 4B for explanatory purposes.

The browser 400 as shown in FIG. 4A differs from the browser 450 show in FIG. 4B. In the same two example browsers, the same unique identifier is shown 402, 452. The search date 460, as shown in FIG. 4B, is three years after the search date 410 shown in FIG. 4A. These two figures show an example of some implementations where a user can log into different browsers 400, 450 over time to allow user actions and preferences stored remotely to be used in providing more tailored results. In FIG. 4B, the search query 454 "gift" on the same day three years later than the search query 404 in FIG. 4A provides tailored results that may not arise without long term targeting over a long time period. For example, the term "birthday" can be stored as an annual preference. Along with this annual preference, other terms can be applied. The gender implicit in "girl" is immutable and provides a gender for future results associated with the "birthday" preference for days surrounding September 10th. However, the term "age 8" will, by its nature, change every year. A preference can be associated with an incremental counter. Thus, instead of a search for 8-year-old gifts, the search can be for 11-year-old gifts. Likewise, if the user purchases gifts in a certain dollar range every year, the search query content items 456 and targeted content items 458 in FIG. 4B can be associated with products within that dollar range.

As discussed previously, the implicit assumptions can also include information about the users actions as related to personal preferences. For example, the user's name according to the unique identifier 402, 452 in FIGS. 4A-B is "John Biggs." John can be an uncle of the gift recipient. As is common for most uncles, John may not know much about the preferences for birthday presents for his niece. If John is looking for gifts generic to his niece's age group, content items specific to her gender and age group can be provided. If John's preferences can be analyzed such that John is implicitly determined to be an "impulse buyer", easy-to-purchase items such as gift cards, as shown in the targeted content items 458, can be shown to the user. In some implementations, a user preference for a particular brand can also be stored. For example, if John has purchased American Girl products previously, content items associated with American Girl can be provided in subsequent searches. The content items can be provided sequentially. For example, a doll can be advertised in the first content item. Next, clothing and accessories for the particular doll in a second content item. The third content item can advertise furniture for the doll.

In some implementations, the information associated with the unique identifier 452 can include more than the user actions and preferences as described above. For example, in FIG. 4B, the unique identifier 452 is shown as a user profile. The user profile can include explicit information provided by the user and implicit information derived from the system. The explicit information can include, for example, the gender, age, location, interests, occupation, etc., of the user. Likewise, the user profile can include a list of contacts. In some implementations, at least one of the contacts can have an associated user profile. In some implementations, the user profile can be a universal profile associated with applications for e-mail, instant messaging, image and video sharing, etc.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
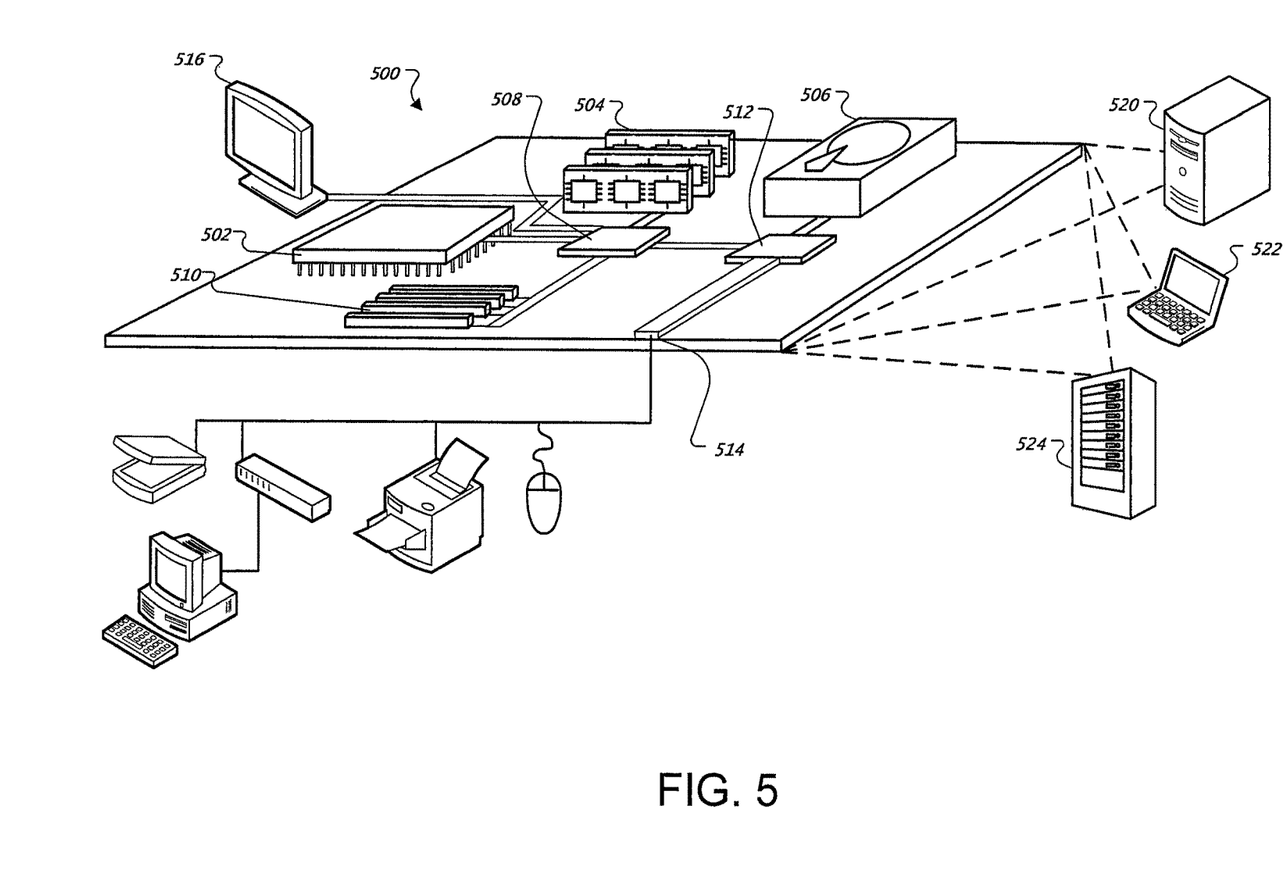
FIG. 5 is an example block diagram of a programmable processing system.

An example of one such type of computer is shown in FIG. 5, which shows a block diagram of a programmable processing system (system) 510 suitable for implementing apparatus or performing methods of various aspects of the subject matter described in this specification. The system 510 includes a processor 520, a random access memory (RAM) 521, a program memory 522 (for example, a writable read-only memory (ROM) such as a flash ROM), a hard drive controller 523, a video controller 531, and an input/output (I/O) controller 524 coupled by a processor (CPU) bus 525. The system 510 can be preprogrammed, in ROM, for example, or it can be programmed (and reprogrammed) by loading a program from another source (for example, from a floppy disk, a CD-ROM, or another computer).

The hard drive controller 523 is coupled to a hard disk 530 suitable for storing executable computer programs, including programs embodying aspects of the subject matter described in this specification, and data including internet audience marketing.

The video controller 531 is coupled to a video recorder 532, which can be used for storing and importing video footage and for writing final output.

The I/O controller 524 is coupled by means of an I/O bus 526 to an I/O interface 527. The I/O interface 527 receives and transmits data (e.g., stills, pictures, movies, and animations for importing into a composition) in analog or digital form over communication links such as a serial link, local area network, wireless link, and parallel link.

Also coupled to the I/O bus 526 is a display 528 and a keyboard 529. Alternatively, separate connections (separate buses) can be used for the I/O interface 527, display 528 and keyboard 529.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a user including assigning the user a unique identifier and recognizing the user each time the user interacts with a content management system;
   logging user actions and preferences as a user interacts with one or more web based resources over a long time period where the long time period exceeds a life of one session and an expiration of one or more cookies residing on a device used by the user to access web based resources, logging including storing the user actions and preferences;

receiving from the user a first request for content, the request received at the content management system; and targeting content to the user based on the stored user actions and preferences, including:
  identifying, in the stored user actions and preferences, logged user actions and preferences that are associated with a same time period in a previous year, including identifying immutable and mutable aspects of the logged user actions and preferences that are related to time;
  adjusting the mutable aspects based on the current date; and
  providing, to the user, content based on the immutable aspect, the adjusted mutable aspects, and information included in the request for content.

2. The method of claim 1, wherein the stored preferences of the user received on a first day have a stronger weight than stored preferences received on a prior second day.

3. The method of claim 1, wherein the unique identifier is associated with a user profile.

4. The method of claim 1 where the unique identifier is of a form of a user profile.

5. The method of claim 4, further comprising targeting content to the user based on information explicitly associated with the user profile.

6. The method of claim 5, wherein the explicit targeting is disabled based on user preferences associated with the user profile.

7. The method of claim 1, wherein the immutable aspects and the mutable aspects correspond to characteristics associated with the user.

8. A non-transitory computer program product including instructions stored on a non-transitory tangible medium that when executed by a processor operate to:
  identify a user including assigning the user a unique identifier and recognizing the user each time the user interacts with a content management system;
  log user actions and preferences as a user interacts with one or more web based resources over a long time period where the long time period exceeds a life of one session and an expiration of one or more cookies residing on a device used by the user to access web based resources, the logging including storing the user actions and preferences;
  receive from the user a first request for content, the request received at the content management system; and
  target content to the user based on the stored user actions and preferences, including:
    identifying, in the stored user actions and preferences, logged user actions and preferences that are associated with a same time period in a previous year, including identifying immutable and mutable aspects of the logged user actions and preferences that are related to time;
    adjusting the mutable aspects based on the current date; and
    providing, to the user, content based on the immutable aspect, the adjusted mutable aspects, and information included in the request for content.

9. The product of claim 8, wherein the stored preferences of the user received on a first day have a stronger weight than stored preferences received on a prior second day.

10. The product of claim 8, wherein the unique identifier is associated with a user profile.

11. The product of claim 8 where the unique identifier is of a form of a user profile.

12. The product of claim 11, further comprising targeting content to the user based on information explicitly associated with the user profile.

13. The product of claim 12, wherein the explicit targeting is disabled based on user preferences associated with the user profile.

14. The product of claim 8, wherein the mutable aspects and the immutable aspects correspond to characteristics associated with the user.

15. A system comprising:
  one or more processors; and
  one or more memory elements including instructions that when executed cause the one or more processors to:
    identify a user including assigning the user a unique identifier and recognizing the user each time the user interacts with a content management system;
    log user actions and preferences as a user interacts with one or more web based resources over a long time period where the long time period exceeds a life of one session and an expiration of one or more cookies residing on a device used by the user to access web based resources, the logging including storing the user actions and preferences;
    receive from the user a first request for content, the request received at the content management system; and
    target content to the user based on the stored user actions and preferences, including:
      identifying, in the stored user actions and preferences, logged user actions and preferences that are associated with a same time period in a previous year, including identifying immutable and mutable aspects of the logged user actions and preferences that are related to time;
      adjusting the mutable aspects based on the current date; and
      providing, to the user, content based on the immutable aspect, the adjusted mutable aspects, and information included in the request for content.

16. The system of claim 15, wherein the stored preferences of the user received on a first day have a stronger weight than stored preferences received on a prior second day.

17. The system of claim 15, wherein the unique identifier is associated with a user profile.

18. The system of claim 15 where the unique identifier is of a form of a user profile.

19. The system of claim 18, further comprising targeting content to the user based on information explicitly associated with the user profile.

20. The system of claim 15, wherein the mutable aspects and the immutable aspects correspond to characteristics associated with the user.

* * * * *

UNITED STATES PATENT AND TRADEMARK OFFICE
CERTIFICATE OF CORRECTION

PATENT NO. : 9,785,968 B1  
APPLICATION NO. : 13/175702  
DATED : October 10, 2017  
INVENTOR(S) : Leal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 114 days.

Signed and Sealed this
Nineteenth Day of June, 2018

Andrei Iancu
*Director of the United States Patent and Trademark Office*